United States Patent
Glejbol et al.

(10) Patent No.: US 10,865,931 B2
(45) Date of Patent: Dec. 15, 2020

(54) METHOD AND A SYSTEM FOR CONTROLLING THE TEMPERATURE OF A FLUID IN AN UNBONDED FLEXIBLE PIPE

(71) Applicant: National Oilwell Varco Denmark I/S, Brondby (DK)

(72) Inventors: Kristian Glejbol, Glostrup (DK); Michael Hjorth, Roskilde (DK); Bo Asp Moller Andersen, Stenlose (DK); Nicky Weppenaar, Copenhagen K (DK); Christian Ditlev Cappeln, Soborg (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 328 days.

(21) Appl. No.: 15/751,270

(22) PCT Filed: Aug. 5, 2016

(86) PCT No.: PCT/DK2016/050261
§ 371 (c)(1),
(2) Date: Feb. 8, 2018

(87) PCT Pub. No.: WO2017/025095
PCT Pub. Date: Feb. 16, 2017

(65) Prior Publication Data
US 2018/0245725 A1 Aug. 30, 2018

(30) Foreign Application Priority Data

Aug. 10, 2015 (DK) .................................. 2015 70512

(51) Int. Cl.
*F16L 53/37* (2018.01)
*F16L 53/34* (2018.01)
(Continued)

(52) U.S. Cl.
CPC ............... *F16L 53/37* (2018.01); *F16L 11/08* (2013.01); *F16L 11/12* (2013.01); *F16L 11/127* (2013.01);
(Continued)

(58) Field of Classification Search
CPC .. F16L 53/37; F16L 11/12; F16L 11/08; F16L 11/127; F16L 53/34; H05B 1/0244; G01K 13/00
See application file for complete search history.

(56) References Cited

U.S. PATENT DOCUMENTS

| 4,751,495 A | 6/1988 | Whitman |
| 5,289,561 A | 2/1994 | Costa Filho |

(Continued)

FOREIGN PATENT DOCUMENTS

| DE | 10207794 A1 | 9/2003 |
| EP | 2 493 262 A1 | 8/2012 |

(Continued)

OTHER PUBLICATIONS

Danish Search Report for Application No. PA 2015 70512, dated Mar. 8, 2016.

(Continued)

*Primary Examiner* — Donnell A Long
(74) *Attorney, Agent, or Firm* — Pearne & Gordon LLP

(57) ABSTRACT

The present invention relates to a method and a system comprising a floating unit for processing, handling or storing a fluid and at least one unbonded flexible pipe for transporting said fluid to the floating unit. The unbonded flexible pipe comprises an electric heating system, and the temperature of the fluid in the unbonded flexible pipe is measured and the measured temperature is used to control the electrical input to the electric heating system in the unbonded flexible pipe.

19 Claims, 3 Drawing Sheets

(51) Int. Cl.
*G01K 13/00* (2006.01)
*F16L 11/127* (2006.01)
*F16L 11/08* (2006.01)
*F16L 11/12* (2006.01)
*H05B 1/02* (2006.01)

(52) U.S. Cl.
CPC .............. *F16L 53/34* (2018.01); *G01K 13/00* (2013.01); *H05B 1/0244* (2013.01)

(56) References Cited

U.S. PATENT DOCUMENTS

| | | | |
|---|---|---|---|
| 6,707,012 B2 | 3/2004 | Stone, Jr. | |
| 2003/0155029 A1* | 8/2003 | Glejbol | F16L 11/083 138/134 |
| 2009/0107558 A1 | 4/2009 | Quigley et al. | |
| 2010/0013457 A1* | 1/2010 | Nero, Jr. | G01R 15/142 324/119 |
| 2011/0056986 A1* | 3/2011 | Shank | B60S 1/488 222/146.2 |
| 2013/0213487 A1 | 8/2013 | Qu et al. | |
| 2015/0122362 A1* | 5/2015 | Haugan | H02M 5/4505 138/33 |
| 2018/0215351 A1* | 8/2018 | Bayard | H05B 3/48 |

FOREIGN PATENT DOCUMENTS

| | | |
|---|---|---|
| GB | 2 423 686 A | 8/2006 |
| WO | 02/16732 A1 | 2/2002 |
| WO | 2010/135772 A1 | 12/2010 |
| WO | 2015/014365 A1 | 2/2015 |
| WO | 2015/023462 A1 | 2/2015 |

OTHER PUBLICATIONS

International Search Report for International Application No. PCT/DK2016/050261, dated Sep. 19, 2016.
"Recommended Practice for Flexible Pipe", ANSHI/API Recommended Practice 17B, fourth edition, Jul. 2008.
"Specification for Unbonded Flexible Pipe", ANSI/API Specification 17J, third edition, Jul. 2008.

* cited by examiner

METHOD AND A SYSTEM FOR CONTROLLING THE TEMPERATURE OF A FLUID IN AN UNBONDED FLEXIBLE PIPE

The present invention relates to a method comprising a floating unit for processing, handling or storing a fluid and at least one unbonded flexible pipe for transporting said fluid to the floating unit, said unbonded flexible pipe comprising a first end connected to the floating unit and a second end connected to a source for fluid, and an electric heating system connected to an electric power source.

TECHNICAL FIELD

Unbonded flexible pipes are frequently used as flexible risers or flexible flowlines for the transport of fluid hydrocarbons such as oil and gas.

Moreover, unbonded flexible pipes are often used e.g. as riser pipes or flowlines in the production of oil or other subsea applications.

The unbonded flexible pipes are constructed of a number of independent layers, such as helically laid steel and polymeric layers formed around a central bore for transporting fluids. A typical unbonded flexible pipe comprises, from the inside and outwards, an inner armouring layer known as the carcass, an internal pressure sheath surrounded by one or more wound layers, such as pressure armouring and tensile armouring, and an outer sheath. Thus, the carcass and the internal pressure sheath form a bore in which the fluid to be transported is conveyed. The annular space between the internal pressure sheath and the outer sheath is known as the annulus and houses the pressure armouring and the tensile armouring and optionally intermediate sheaths.

The armouring layers comprise or consist of multiple elongated armouring elements that are not bonded to each other directly or indirectly via other layers along the pipe. Hereby the pipe becomes bendable and sufficiently flexible to coil up for transportation. The armouring elements are very often manufactured from metallic and electrically conductive material.

Flexible unbonded pipes of the present type are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. As mentioned such pipes usually comprise an innermost sealing sheath—often referred to as an internal pressure sheath, which forms a barrier against the outflow of the fluid which is conveyed in the bore of the pipe, and one or usually a plurality of armouring layers. The internal pressure sheath forms the bore of the pipe i.e. the inner surface of the internal pressure sheath forms the bore. Normally the pipe further comprises an outer protection layer, often referred to as the outer sheath, which provides mechanical protection of the armour layers. The outer protection layer may be a sealing layer sealing against ingress of sea water. In certain unbonded flexible pipes one or more intermediate sealing layers is/are arranged between armour layers.

The term "unbonded" means in this context that at least two of the layers including the armouring layers and polymer layers are not bonded to each other. In practice the known pipe normally comprises at least two armouring layers located outside the internal pressure sheath and optionally an armour structure located inside the internal pressure sheath, which inner armour structure normally is referred to as the carcass.

In general flexible pipes are expected to have a lifetime of 20 years in operation.

The unbonded flexible pipes can carry the fluids between a hydrocarbon reservoir located under the sea bed and a floating structure. The fluid may be a hydrocarbon fluid, such as natural gas or oil, depending upon the nature of the hydrocarbon reservoir, or an injection fluid such as water. The fluids which are transported to the floating structure may be processed, for example by compression and/or further treatment. When the floating structure is moored close to a gas field or hydrocarbon reservoir, it can be kept in fluid communication with the producing well heads via one or more flexible risers. The one or more flexible risers can convey fluids between the well heads of a hydrocarbon reservoir and the floating structure. Flexible risers can be configured as free-hanging catenaries or provided in alternative configurations, such e.g. as lazy wave, using buoyancy modules.

Thus, a flexible riser may be connected at one end to the floating structure, and at another end to a riser base manifold, which can secure the flexible riser to the sea bed.

When the hydrocarbon enters the floating structure it is common to treat the hydrocarbon and prepare it for use in processes, such as cracking, refining, etc. Examples of floating structures having such capacities are FPSOs (floating production and storage offloading units).

In recent years some types of flexible unbonded pipes have been equipped with heating systems, such as electric heating, in particular unbonded flexible pipes for use in cold environments. The electric heating system may utilize the metallic armour layers in the unbonded flexible pipe. Such a system is e.g. disclosed in international patent application WO 2015/014365 A1.

DISCLOSURE OF INVENTION

An object of the present invention is to provide a method which may facilitate the processing of hydrocarbon on a floating unit.

The invention also provides a system in which electric heating in an unbonded flexible pipe is controlled in response to the temperature of the fluid in the bore of the unbonded flexible pipe.

The present invention relates to a method comprising a floating unit for processing, handling or storing a fluid and at least one unbonded flexible pipe for transporting said fluid to the floating unit, said unbonded flexible pipe comprising a first end connected to the floating unit and a second end connected to a source for fluid, and an electric heating system connected to an electric power source, the temperature of the fluid in at least a part of the flexible pipe is measured;

the measured temperature is used as a parameter for partly or fully controlling the electric power input from the electric power source to the heating system;

wherein the electric power input to the heating system is controlled so the fluid in the first end of the flexible pipe has a temperature substantially corresponding to a predetermined temperature.

Consequently, the invention provides a method by which it is possible to utilize the heat supplied to a fluid in the unbonded flexible pipe conveying the fluid to the floating unit. The fluid preferably comprises hydrocarbons, such as oil, which should be processed or stored on the floating unit. The floating unit is a vessel comprising means for processing hydrocarbon, such as by cracking or refining.

The term "measure" in measured/measuring a parameter e.g. temperature includes both a direct measurement as well as a measurement of a related parameter by which the parameter in question can be calculated. The terms "measure" and "determine" are used interchangeably.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

The term "substantially" should herein be taken to mean that ordinary product variances and tolerances are comprised.

The phrase "fully or partly controlling" means that the electric power input, may be fully determined by the temperature measured in the fluid in the unbonded flexible pipe or only partly determined, i.e. other parameters such as e.g. the composition of the fluid, viscosity and/or environmental temperature may additionally be used to control or determine the electrical input. In practice the measured data are collected and processed in a processing unit, e.g. a computer, which will send input to the electric power source. The program for the computer may easily be adapted without inventive skill.

In respect of the composition of the fluid, the fluid may comprise more phases, such as a liquid phase, a gaseous phase, and/or a solid phase. In some embodiments you may choose to measure on the liquid phase only, or the gaseous phase only. Thus, the predetermined temperature may be selected depending on which phase you decide to measure.

One advantage obtained by heating the fluid before it arrives at the first end of the pipe is that process time and process equipment on the floating unit can be optimized and minimized.

An additional benefit of the system is that the flexible pipe has a temperature substantially corresponding to a predetermined temperature which ensures that the pipe does not become too cold or too hot. In case the pipe becomes too cold, components in the fluid may become solid and block the bore. However, if the pipe becomes too hot this may lead to damage, e.g. the internal pressure sheath which is normally made from a polymer sheath may be damaged. Moreover, only to heat the fluid to a predetermined temperature may serve to save energy.

The predetermined temperature is conveniently a temperature between 30° C. and 130° C., such as between 40° C. and 120° C.

According to the method the fluid in the first end of the pipe is heated to a predetermined temperature by means of the electric heating system in the unbonded flexible pipe before the fluid is delivered to the floating unit.

The first end of the pipe is the part where the unbonded flexible pipe is terminated in an end-fitting which is connected to a connector on the floating unit. Thus, the first end of the pipe extends from the end-fitting and up to 1500 m towards the second end of the pipe. The first end of the pipe may have a length in the range from about 1 m to about 1500 m, suitably from about 10 m to about 1000 m, preferably from about 50 m to about 500 m.

In an embodiment the predetermined temperature is close to the optimal temperature for subsequent processing, handling or storing on the floating unit. Thus, when the fluid enters the floating unit it has a temperature for processing or storing, and further heating may not be required.

According to the method, the temperature of the fluid, at least in a part of the unbonded flexible pipe, is measured and the temperature is used as a parameter in a processing unit and control device which is connected to and controls the electric power source. Depending on the output from the processing unit, the electric power source will deliver an electric power input to the heating system in the unbonded flexible pipe. In this sense, the measured temperature of the fluid in the bore of the unbonded flexible pipe is used to control the electrical input to the heating system.

The temperature of the fluid in the entire length of the unbonded flexible pipe may be measured including the temperature of the fluid in the second end. However, in an embodiment of the method the temperature of the fluid in the first end of the flexible pipe is measured. The first end of the unbonded flexible pipe is closest to the floating unit and should have at temperature close to or corresponding to the predetermined temperature.

In an embodiment the heating comprises direct heating of the fluid. Direct heating of the fluid results in a relatively rapid heating of the fluid. The direct heating may be done by heating elements placed in the bore of the pipe. However, the heating element may also be constituted by a carcass in the unbonded flexible pipe. Thus, in an embodiment the heating system comprises a carcass. The carcass is in direct contact with the fluid conveyed in the pipe, and usually the carcass is made from a metallic material which is electrically conductive. Consequently, it is convenient to use the carcass as the heating system.

The carcass in the unbonded flexible pipe is wound up from an elongate member such as a metal strip. The elongate member is wound up to form a tube, the carcass, which is located in the bore of the pipe and supports the internal pressure sheath. The winding degree is typically from between 85° to 89.8°. The elongate member is electrically conductive and will preferably have a specific electrical resistivity of about $10^{-6}$ Ω·m or less.

In an embodiment the electric power input is provided in pulses to the electric heating system. The pulses may e.g. be provided as PWM (pulse-width modulation). The electric power provided in pulses may serve to reduce the risk of local overheating and formation of "hot spots" which are undesired.

In an embodiment of the method the pulses have a length in the range from about $10^6$ Hz to about 10 Hz (PWM mode) or from about 10 Hz to about $10^{-3}$ Hz (switch mode).

The length of the unbonded flexible pipes may vary within a rather broad range. The length may vary from about 50 m up to about 5000 m, such as from about 100 m up to about 2500 m, or from about 200 m up to 2000 m.

The applied current may be in the range of from 500 Ampere to about 5000 Ampere. The longer the unbonded flexible pipe, the higher the required current is.

In an embodiment the electric power input is provided as AC current.

In an embodiment the electric power input is provided as DC current.

When the electric power input is provided as AC current several means, besides the processing unit and control device, may be used to control the electric power input to the electric heating system, and in an embodiment the means for controlling the electric power input to the heating system comprise a transformer with variable turns ratio or a diode. As such the control device may operate the transformer or diode.

In an embodiment the means for controlling the electric power input to the heating system comprises a thyristor switch operated either in PWM mode, switch mode or a combination hereof. This is useable for both AC and DC current.

The temperature of the fluid conveyed in the unbonded flexible pipe is measured by one or more sensors. The one or more sensors may only measure the temperature in the first end of the unbonded flexible pipe. However, the one or more sensors may also measure the temperature of the fluid in the entire length of the unbonded flexible pipe. Thus, the temperature of the fluid in the second end of the unbonded flexible pipe and an optional mid-section of the pipe may be measured and the result may be processed in the control device and utilized for controlling the power input to the electric heating. Moreover, the temperature sensors may also measure the temperature of the pipe e.g. to avoid overheating.

Although several types of sensors, such as thermistors or thermocouples, may be used for measuring the temperature of the fluid in the bore of the unbonded flexible pipe, in an embodiment the temperature of the fluid in the unbonded flexible pipe is measured by at least one optical sensor. The optical sensor may be based on a distributed measurement principle like Brillouin Scattering or Raman scattering, or on a point measurement principle like FBG (Fiber Bragg Gratings).

It has been found that where an optical fiber is a part of a temperature sensor system a very accurate temperature determination along the length of the unbonded flexible pipe can be achieved, and even small temperature variations can be measured. Since local overheating (hot spots) may potentially damage the polymer layers, such as the outer sheath or the internal pressure sheath of the unbonded flexible pipe, it is advantageous to monitor the temperature in the pipe. However, another problem, which may arise when the fluid is oil, is a local decrease in temperature which may result in an undesired formation and deposition of clathrate hydrates within the bore. This may slow down or block the flow of fluid in the bore of the pipe and is a problem if the temperature becomes too low.

As in the case of the temperature sensors, the heating system may be present in only a part of the unbonded flexible pipe.

In an embodiment the heating system is present in the part of the unbonded flexible pipe closest to the first end. Thus, the heating system is present in the part of the unbonded flexible pipe from which the fluid is delivered to the floating unit.

In an embodiment the heating system is present in the unbonded flexible pipe in the entire length. Thus, it is possible to heat the fluid during its entire passage of the unbonded flexible pipe.

In an embodiment the heating system is present in an unbonded flexible pipe made from multiple sections. The sections may have the same or different properties, and it is possible to provide an unbonded flexible pipe having different heating properties in different sections. Each section will preferably be connected to a temperature measuring system.

In an embodiment the heating system comprises a pressure armour. The pressure armour is made from metallic and electrically conductive elongate members and wound around the internal pressure sheath. In the case of an unbonded flexible pipe with a smooth bore, the pressure armour may be the layer which is closest to the bore and the conveyed fluid, which is also electrically conductive end usable for electric heating. In case the unbonded flexible pipe comprises a carcass, the pressure armour may optionally serve as a return path for the current sent through the carcass. Thus, an electric circuit may be formed by the electric power source, the carcass and the pressure armour.

In an embodiment the heating system comprises a tensile armour. The tensile armour is also manufactured from metallic and electrically conductive material and normally wound on the outer surface of the pressure armour. The tensile armour may e.g. serve as return path for the current first sent though the carcass or the pressure armour.

The unbonded flexible pipe may comprise one or more intermediate layers, such as anti-friction layers and insulating layers, and in an embodiment the unbonded flexible pipe comprises at least one insulating layer. The insulating layer may provide both thermal and electrical insulation.

According to the method the fluid in the first end of the unbonded flexible pipe is heated to a temperature which is a predetermined temperature. The predetermined temperature may be chosen to correspond to the processing temperature for the fluid or the storage temperature for the fluid or be any desired temperature for the fluid. In an embodiment the predetermined temperature is in the range of about 30° C. to about 130° C.

The second end of the unbonded flexible pipe is connected to a source for fluid which may be a fluid carrying vessel or a production platform, and in an embodiment the second end of the unbonded flexible pipe is connected to a sub-sea well. The sub-sea well is preferably a source for hydrocarbon such as e.g. oil.

In an embodiment of the method the fluid is extracted from a well and having a first temperature and the fluid is heated in the flexible pipe to a second temperature which is higher than the first temperature. In the embodiment the second temperature corresponds to the predetermined temperature. Thus, oil from a well having a relatively low temperature may be heated to a higher temperature, the predetermined temperature, during its passage through the unbonded flexible pipe. Thus, the second temperature is 30° C. or higher.

When the fluid is e.g. oil and should be processed on the floating structure, the fluid is required to have a certain temperature, i.e. a processing temperature which may correspond to the predetermined temperature. Thus, the fluid may be heated to the processing temperature in the unbonded flexible pipe and requires no further heating before processing. Thus, the method according to the invention provides a method in which there is no heat exchange between the fluid and a heat exchanger on the floating unit before processing of the fluid. Thus, in principle it is possible to have a floating unit without heat exchangers.

The invention also provides a system comprising a floating unit for processing, handling or storing a fluid and at least one unbonded flexible pipe connected to the floating unit at a first end and connected to a fluid production facility at a second end, the unbonded flexible pipe comprises electric heating, the system comprises a control device which receives temperature measurements from the fluid entering the floating unit via the unbonded flexible pipe and in response to the measured temperature, the control device controls the electrical input to the electric heating in the unbonded flexible pipe.

The fluid entering the floating unit comes from the first end of the pipe, and the temperature of the fluid is measured in the first end of the pipe. However, the temperature of the fluid may be measured in the entire length of the unbonded flexible pipe.

The control device comprises a processing unit which processes the temperature measurements and, depending on the result, the control device will or will not send a signal to an electric power source. In case the measured temperature of the fluid in the pipe is lower than a predetermined temperature, the electric power source will deliver an electrical input to the electric heating system in the unbonded flexible pipe. The electrical input will have a sufficient power to heat the fluid in the first end of the pipe to a temperature substantially corresponding to the predetermined temperature which may be the processing temperature or storage temperature for the fluid.

The electrical input may preferably be delivered as alternating current (AC) or direct current (DC).

In an embodiment of the system the electrical input is sent in pulses to the electric heating system in the unbonded flexible pipe. The pulses may have a length in the range from about $10^6$ Hz to about 10 Hz (PWM mode) or from about 10 Hz to about $10^{-3}$ Hz switch mode. When the electrical input is sent in pulses, the possibility of avoiding hot spots and local overheating of the pipe structure is increased.

In an embodiment the fluid is heated in the unbonded flexible pipe to a temperature corresponding to the processing temperature of the fluid on the floating unit. Thus, there may be no need for heat-exchangers to heat the oil on the floating unit. The processing temperature on the floating unit is in the range of about 60° C. to about 130° C.

In an embodiment, the temperature of the fluid is measured by at least one optical sensor connected to an optical monitoring system. Optical sensors are able to provide very precise measurements of temperature and e.g. other parameters in an unbonded flexible pipe.

In the system according to the invention the output from the optical monitoring system is communicated to the control device. In response to the output from the optical monitoring system, the control device will decide if an electrical input should be sent to the electric heating system in the unbonded flexible pipe from an electric power source connected to the control device.

In an embodiment the control device and the electric power source are located on the floating unit. Thus, the control device and the electric power source are close to the unbonded flexible pipe and the electric heating.

DETAILED DESCRIPTION OF THE INVENTION

The invention will now be described in further details with reference to embodiments shown in the drawing in which.

The figures are not accurate in every detail but are only sketches intended to the show the principles of the invention. Details which are not a part of the invention may have been omitted. In the figures the same reference numbers are used for the same parts.

Figure 1:
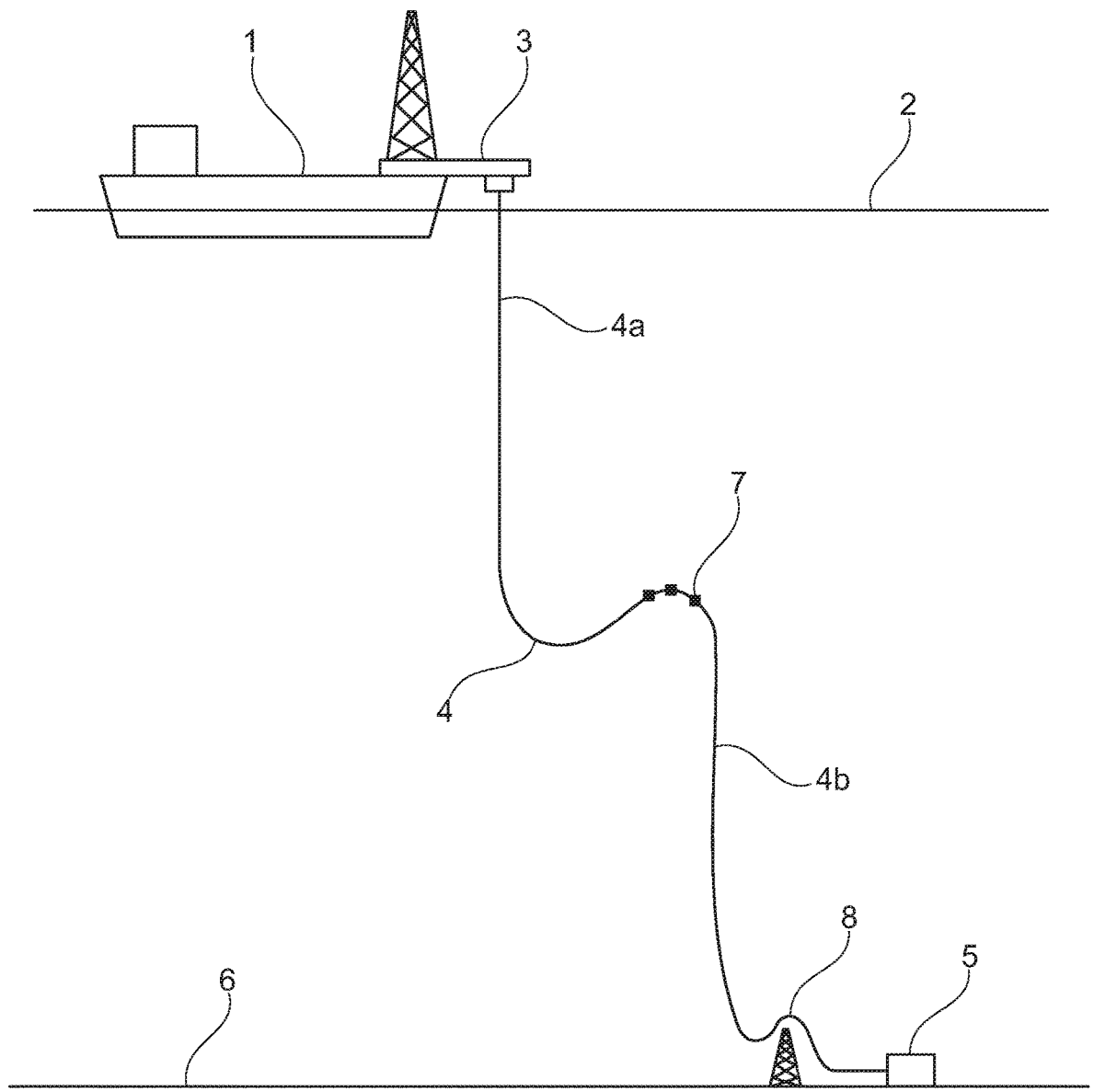
FIG. 1 shows an embodiment of the method according to the invention.

FIG. 1 shows an embodiment in which the method is carried out. A floating unit 1 is floating on the sea surface 2. Via a connecting structure 3 the floating unit 1 is connected to an unbonded flexible pipe 4 having a first end 4a and a second end 4b, which extends from the connecting structure 3 to a sub-sea well 5 located at the seabed 6. The unbonded flexible pipe 4 hangs in an "S"-shaped configuration and is supported by floats 7 and a support rail 8 located on the seabed 6.

A control device and an electric power supply are located on the floating unit 1 and not visible on the figure. The unbonded flexible pipe 4 comprises a heating system and a temperature monitoring system. In this embodiment the heating system and the temperature monitoring system extend through the entire unbonded flexible pipe, and it is possible to heat and monitor the temperature in both the first end 4a and the second end 4b of the unbonded flexible pipe 4.

The heating system comprises a metallic electrically conductive carcass, which is the primary heating unit. The electrically conductive carcass is the carcass in the unbonded flexible pipe 4. A metallic electrically conductive tensile armour in the unbonded flexible pipe 4 serves as a return path for the current which is sent to the carcass. Consequently, when an electric current is sent through the Joule heating will occur due to the electrical resistance in the metallic material. The carcass is in direct contact with the fluid conveyed in the unbonded flexible pipe 4, and the heat generated in the carcass will be transferred rapidly into the fluid.

When the fluid is conveyed from the well 5 to the floating unit 1 via the unbonded flexibe pipe 4, the temperature is measured in the fluid in the bore of the unbonded flexible pipe by temperature sensors connected to the temperature monitoring system which forms part of the control device. The temperature monitoring system is based on optical sensors and is able to provide a rather precise temperature profile of the fluid conveyed in the unbonded flexible pipe 4.

When the temperature monitoring system receives a signal from the temperature sensors, this signal is sent to and processed in the control device. The signal comprises information about a measured temperature of the fluid. If the measured temperature is below a predetermined temperature, the control device will send a signal to the power source causing an electrical input to be sent to the heating system in the unbonded flexible pipe, i.e. the carcass. If the measured temperature corresponds to or is above the predetermined temperature, no electrical input will be sent to the heating system.

Figure 2:
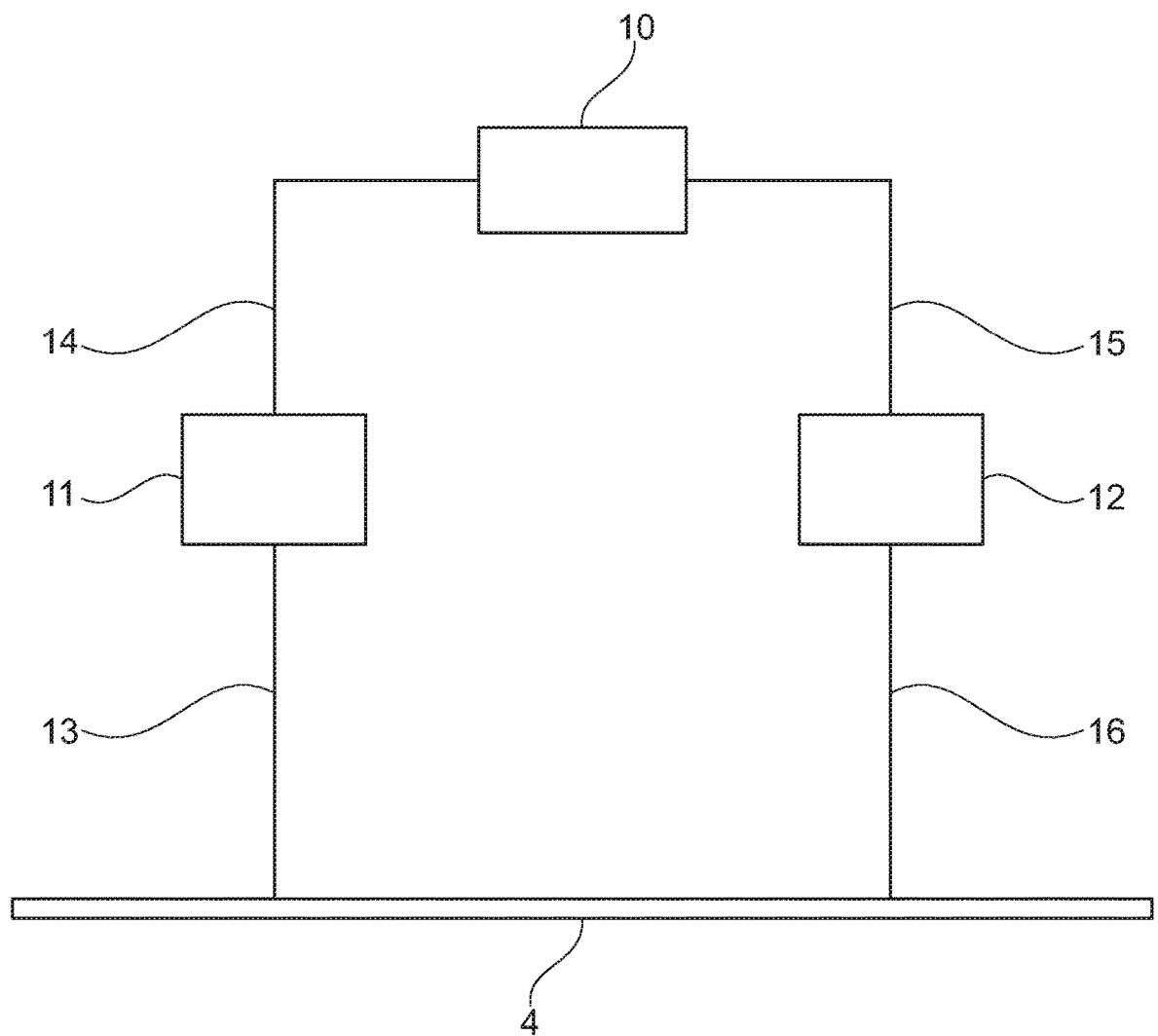
FIG. 2 shows a diagram according to the invention.

The principles are shown in FIG. 2, which is a simplified diagram illustrating the principles of the invention. The control device 10 is connected to the unbonded flexible pipe 4 via the temperature monitoring system 11 and the power source 12, and the lines 13, 14, 15 and 16.

During operation the temperature monitoring system 11 receives temperature measurements from temperature sensors in the unbonded flexible pipe 4 via line 13. The temperature measurements correspond to the temperature of the fluid in the pipe at certain positions in the pipe. The temperature measurements are collected and processed in the temperature monitoring system 11 and the result is delivered to the control device 10 via line 14. In the control device 10 the result is compared to a predetermined temperature, and if the result is below the predetermined temperature, the control device 10 will send a signal to the power source 12 via line 15. In response to the signal, the power source 12 will send an electrical signal to the heating system in the unbonded flexible pipe. The electric power input is sent as pulses and the power source will continue to deliver these pulses of electric power input until the fluid at a certain position in the unbonded flexible has reached a desired temperature. In the first end of the pipe the desired temperature should substantially correspond to the predetermined temperature at which the fluid is delivered to the floating unit.

Figure 3:
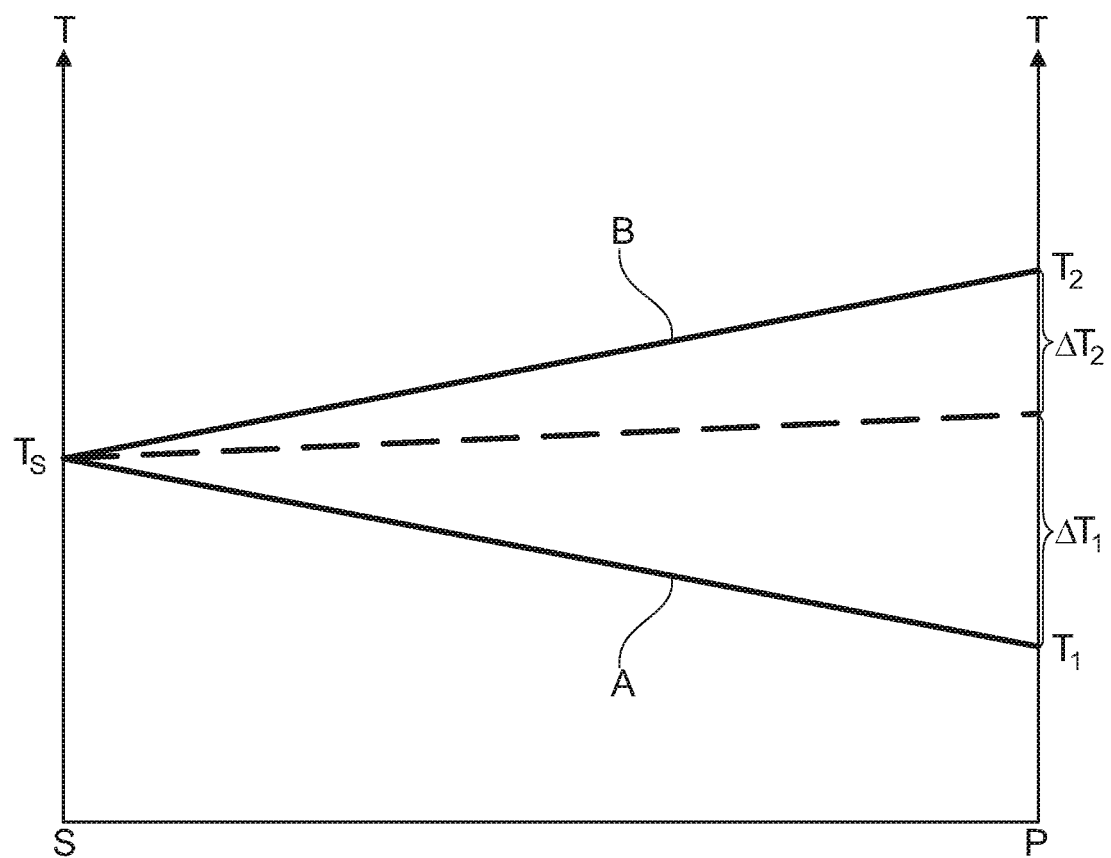
FIG. 3 illustrates how the temperature may be controlled according to the invention.

FIG. 3 illustrates how the temperature of the fluid may be controlled. S is the position of the fluid source, e.g. a well, and the fluid has the temperature $T_S$. $T_1$ and $T_2$ are the temperatures of the fluid, when it is delivered from the unbonded flexible pipe to the floating unit at position P with or without heating.

Curve A shows how the temperature will decrease along the length of the pipe when no heat is applied. When the fluid reaches the floating unit, the temperature will change from $T_S$ to $T_1$, which is a decrease in the temperature of $\Delta T_1$. However, if heat is applied to the fluid during its passage through the unbonded flexible pipe, curve B illustrates that the temperature will reach $T_2$ and the temperature will be increased by $\Delta T_2$ when compared to the temperature $T_S$ at the source. The temperature $T_2$ may be selected to correspond to the processing temperature of the fluid on the floating unit.

The invention claimed is:

1. A method for processing, handling or storing a fluid via a floating unit, at least one unbonded flexible pipe for transporting said fluid to the floating unit, and an electric heating system connected to an electric power source, said unbonded flexible pipe comprising a first end terminated in an end-fitting, which is connected to a connector on the floating unit, and a second end connected to a source for fluid, and the first end extending from the end-fitting up to 1500 m towards the second end, the method comprising:
   the temperature of the fluid in at least a part of the first end of the flexible pipe being measured;
   the measured temperature being used as a parameter for partly or fully controlling the electric power input from the electric power source to the heating system; and
   the electric power input to the heating system being controlled according to the measured temperature parameter such that the fluid in the first end of the flexible pipe has a temperature substantially corresponding to a predetermined temperature.

2. The method according to claim 1, wherein the heating comprises direct heating of the fluid.

3. The method according to claim 1, wherein the heating system comprises a carcass.

4. The method according to claim 1, wherein the predetermined temperature is close to the optimal temperature for subsequent processing, handling or storing of the fluid on the floating unit.

5. The method according to claim 1, wherein the electric power input is provided in pulses to the electric heating system.

6. The method according to claim 5, wherein the pulses have a length in the range from about $10^6$ Hz to about 10 Hz (PWM mode) or from about 10 Hz to about $10^{-3}$ Hz (switch mode).

7. The method according to claim 1, wherein the electric power input is provided as AC current.

8. The method according to claim 1, wherein the electric power input is provided as DC current.

9. The method according to claim 1, wherein the means for controlling the electric power input to the heating system comprise a transformer with variable turns ratio or a diode.

10. The method according to claim 1, wherein the means for controlling the electrical power input to the heating system comprise a thyristor switch operated either in PWM mode, switch mode or a combination hereof.

11. The method according to claim 1, wherein the temperature of the fluid in the unbonded flexible pipe is measured by at least one optical sensor.

12. The method according to claim 1, wherein the heating system is present in an unbonded flexible pipe made from multiple sections.

13. The method according to claim 1, wherein the heating system comprises a pressure armour.

14. The method according to claim 1, wherein the heating system comprises a tensile armour.

15. The method according to claim 1, wherein the unbonded flexible pipe comprises at least one insulating layer.

16. The method according to claim 1, wherein the predetermined temperature is in the range of about 30° C. to about 130° C.

17. The method according to claim 1, wherein the fluid is extracted from a well and having a first temperature, and the fluid is heated in the flexible pipe to a second temperature which is higher than the first temperature.

18. The method according to claim 1, wherein the second temperature is 30° C. or higher.

19. The method according to claim 1, wherein there is no heat exchange between the fluid and a heat exchanger on the floating unit before processing the fluid.

\* \* \* \* \*